United States Patent
Demenois et al.

(10) Patent No.: US 12,448,900 B2
(45) Date of Patent: Oct. 21, 2025

(54) LOCAL STIFFENING FOR GAS TURBINE ENGINE CASING

(71) Applicant: Pratt & Whitney Canada Corp., Longueuil (CA)

(72) Inventors: Morgan Demenois, Montreal (CA); Negin Abaeian, Westmount (CA); Tomasz Olech, Rzeszow (PL); Raghavendra Pendyala, Montreal (CA); Domenico Di Florio, Saint Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/799,108

(22) Filed: Aug. 9, 2024

(65) Prior Publication Data
US 2025/0012204 A1    Jan. 9, 2025

Related U.S. Application Data

(62) Division of application No. 18/348,915, filed on Jul. 7, 2023, now Pat. No. 12,158,076.

(51) Int. Cl.
*F01D 25/04* (2006.01)
*F01D 25/24* (2006.01)
*F02C 3/04* (2006.01)

(52) U.S. Cl.
CPC .............. *F01D 25/04* (2013.01); *F01D 25/24* (2013.01); *F02C 3/04* (2013.01); *F05D 2260/81* (2013.01); *F05D 2260/96* (2013.01)

(58) Field of Classification Search
CPC . F01D 25/04; F01D 25/24; F01D 5/10; F01D 5/26; F01D 25/265; F02C 3/04; F05D 2260/81; F05D 2260/96; F05D 2230/54; F05D 2240/14
See application file for complete search history.

(56) References Cited

U.S. PATENT DOCUMENTS

| | | | |
|---|---|---|---|
| 3,996,019 A * | 12/1976 | Cogan | B23P 17/00 428/941 |
| 5,483,792 A | 1/1996 | Czachor et al. | |
| 5,605,438 A | 2/1997 | Burdgick et al. | |
| 6,257,829 B1 * | 7/2001 | Seeley | F01D 25/00 415/213.1 |
| 7,565,796 B2 | 7/2009 | Eleftheriou et al. | |
| 7,594,405 B2 * | 9/2009 | Somanath | F01D 25/162 415/213.1 |

(Continued)

OTHER PUBLICATIONS

European Search Report for EP Application No. 24186953.6 dated Dec. 9, 2024.

*Primary Examiner* — Jesse S Bogue
(74) *Attorney, Agent, or Firm* — Carlson, Gaskey & Olds, P.C.

(57) ABSTRACT

A gas turbine engine under this disclosure could be said to include a compressor section, a combustor and a turbine section. At least one casing surrounds at least one of the compressor and turbine section. The at least one casing is formed of sheet metal, and has at least one potential peak displacement point due to vibration across a speed range of the at least one of the compressor and turbine section. A stiffening element is fixed to a wall of the casing at the at least one potential peak displacement point. A method is also disclosed.

12 Claims, 2 Drawing Sheets

(56) References Cited

U.S. PATENT DOCUMENTS

| | | |
|---|---|---|
| 7,793,488 B2 | 9/2010 | Eleftheriou et al. |
| 7,797,922 B2 | 9/2010 | Eleftheriou et al. |
| 8,459,942 B2 | 6/2013 | Sjunnesson et al. |
| 8,888,439 B2 | 11/2014 | Harper et al. |
| 9,003,852 B2 * | 4/2015 | Green .................... F01D 25/24 |
| | | 72/168 |
| 9,347,321 B2 * | 5/2016 | Heidari .................. G01M 1/20 |
| 9,498,850 B2 | 11/2016 | Denis et al. |
| 9,677,417 B2 | 6/2017 | Drozdz |
| 9,677,570 B2 | 6/2017 | Care et al. |
| 9,683,490 B2 | 6/2017 | Harper et al. |
| 9,840,937 B2 * | 12/2017 | Shteyman ............... F01D 25/30 |
| 10,233,837 B2 | 3/2019 | Zaccardi et al. |
| 10,378,480 B2 | 8/2019 | Gutierrez et al. |
| 10,392,972 B2 | 8/2019 | Flatscher et al. |
| 10,570,771 B2 | 2/2020 | Kollenrott et al. |
| 10,808,574 B2 | 10/2020 | Langenbrunner et al. |
| 10,815,804 B2 | 10/2020 | Sakala et al. |
| 11,261,757 B2 | 3/2022 | Fryer |
| 11,306,608 B2 | 4/2022 | Marin et al. |
| 11,346,283 B2 | 5/2022 | Dickert et al. |
| 2010/0196149 A1 * | 8/2010 | Beaulieu ............... F01D 25/246 |
| | | 415/182.1 |
| 2011/0283711 A1 | 11/2011 | Petersson et al. |
| 2013/0022457 A1 | 1/2013 | Nethi et al. |
| 2019/0093514 A1 | 3/2019 | Hori et al. |
| 2022/0082028 A1 | 3/2022 | Yang |

* cited by examiner

LOCAL STIFFENING FOR GAS TURBINE ENGINE CASING

CROSS-REFERENCE TO RELATED APPLICATIONS

This application is a divisional of U.S. patent application Ser. No. 18/348,915 filed on Jul. 7, 2023.

BACKGROUND

This application relates to local stiffening to a sheet metal housing for a gas turbine engine to address areas of vibration concern.

Gas turbines are known, and typically include a propulsor delivering air into a core engine. The core engine may include a compressor section for compressing the air and delivering it into a combustor. The air is mixed with fuel and ignited in the combustor. Products of this combustion pass downstream over turbine rotors driving them to rotate. The turbine rotors in turn drive compressor and propulsor rotors.

There are several housings in a typical gas turbine engine. One such housing is an inter compressor case. The inter compressor case may be located between a high pressure compressor and a low pressure compressor. Typically the inter compressor case is formed of sheet metal which is welded to form a full hoop structure. To reduce weight there may be several cutouts in the sheet metal wall.

Further, accessories may be mounted to the inter compressor case.

In practice, the inter compressor case may have a number of locations that raise vibration concerns at speeds within the engine speed running range. There are many nodal diameter modes that may have modal inferences within the engine speed range. That is, the inter compressor case may get excited to vibrate by the rotation of the rotor(s).

SUMMARY

A gas turbine engine under this disclosure could be said to include a compressor section, a combustor and a turbine section. At least one casing surrounds at least one of the compressor and turbine section. The at least one casing is formed of sheet metal, and has at least one potential peak displacement point due to vibration across a speed range of the at least one of the compressor and turbine section. A stiffening element is fixed to a wall of the casing at the at least one potential peak displacement point.

A method of providing a casing for a gas turbine engine under this disclosure could be said to include 1) modeling a casing design for a casing to be formed of sheet metal, 2) determining peak displacement locations based upon the modeling of step 1) and 3) providing a stiffening element at at least one of the peak displacement location, the stiffening element fixed to a wall of the casing.

These and other features will be best understood from the following drawings and specification, the following is a brief description.

DETAILED DESCRIPTION

Figure 1:
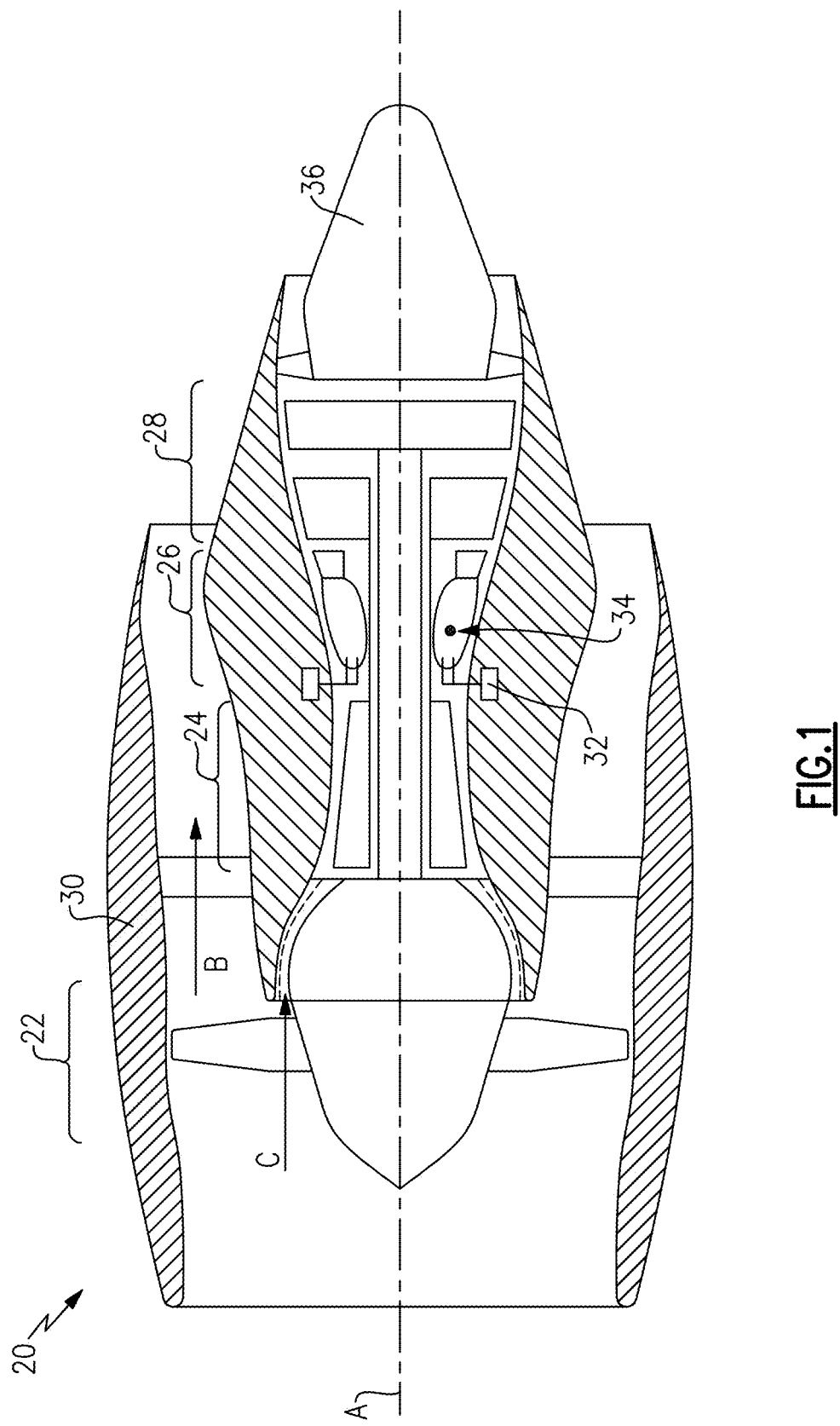
FIG. 1 is a schematic view of a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

Figure 2:
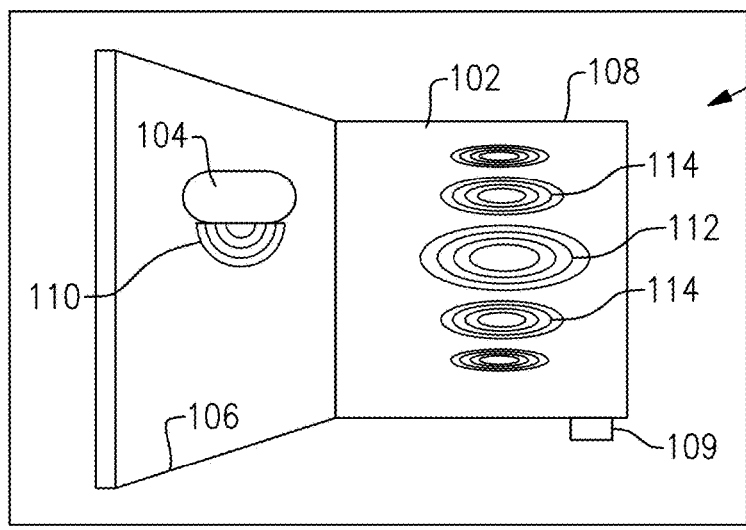
FIG. 2 shows a computer modeling of a casing which may be part of the FIG. 1 engine.

FIG. 2 schematically illustrates a computer 100 modeling a design for a casing 102 which may be an inter compressor case for a gas turbine engine such as that shown in FIG. 1. However, the casing 102 could be in locations other than the compressor, and may be utilized in other type engines.

The casing 102 is formed of thin sheet metal, and provided with cutouts 104. The case is shown to have a relatively large conical portion 106 merging into a relatively smaller diameter cylindrical portion 108. Cutout 104 is in conical portion 106. An accessory 109 is shown mounted on the case 102. The accessory can be any number of components which may be utilized with the gas turbine engine. As examples, the accessory could be sensors, fuel or oil system effectors, tanks, or any number of accessories.

A location of a peak displacement point 110 is determined by the modeling through known techniques. As shown, peak location 110 is adjacent the cutout 104. Further, other displacement portions 112 and 114 are illustrated. Area 112 may be the peak displacement at that axial position on the case 102. Known modeling techniques may be utilized to develop the location of the peak displacement based upon things such as the expected rotor speeds within the engine, the thickness of the sheet metal, etc.

Figure 3:
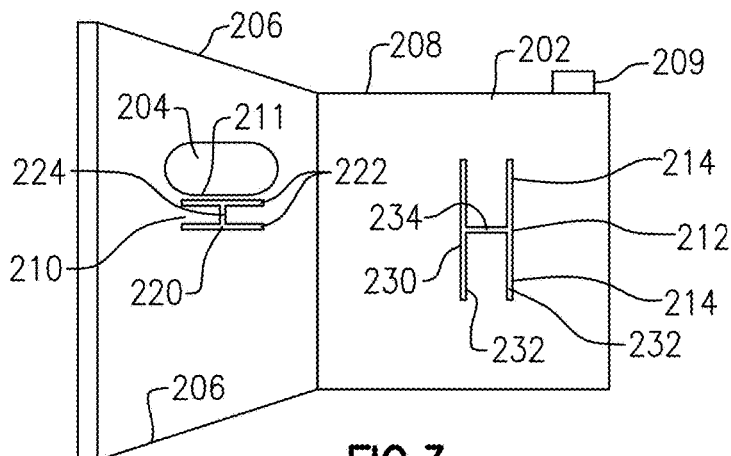
FIG. 3 shows a casing with local stiffening elements resulting from the modeling of FIG. 2.

FIG. 3 shows a casing 202 which may result from the modeling of FIG. 2. Casing 202 has a cutout 204. An area (110) of concern 210 is shown at an edge 211 of the cutout 204. Area of concern 210 may be an area which will potentially be subject to high vibration levels. The casing 202 again has a conical portion 206 extending radially inwardly to a cylindrical portion 208.

Further, area 212 is shown as an area (112) of very high likely vibration, with areas 214 showing circumferentially adjacent which may be also of concern due to vibration levels.

A stiffening element 220 is put on location 210 to provide local stiffness to the casing. The use of this stiffening element will mistune the casing at that location such that the area 210 should be of less concern. The stiffening element 220 illustrated here has a general H-shape with legs 222 connected by a connection 224.

Similarly, a H-shaped stiffening element 230 extends across area of concern 212 and adjacent areas 214. Again, there are legs 232 connected by a connector 234. As is clear, the legs 232 and connector 234 are all affixed to the outer surface of the casing 202.

As shown, an accessory 209 may be on the wall of the casing 202 and may cause some of the vibration concerns at areas 212 and 214.

Figure 4:
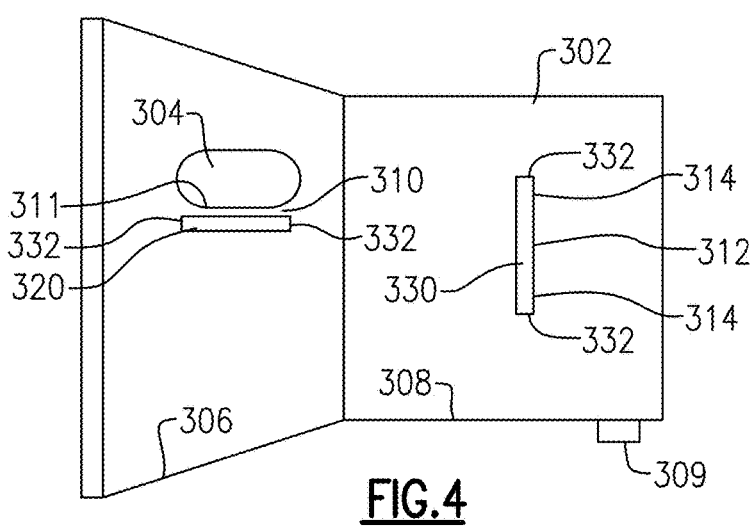
FIG. 4 shows another embodiment casing.

FIG. 4 shows another embodiment casing 302. Here, a cutout 304 has a stiffening element 320 on area 310 adjacent an edge 311. Stiffening element 320 is bar shaped and extends between ends 332. The casing 302 again has a conical portion 306 extending radially inwardly to a cylindrical portion 308. A stiffening element 330 extends across areas 312 and 314. Stiffening element 330 is bar shaped and has ends 332 which will end within the areas of concern 314.

Figure 5:
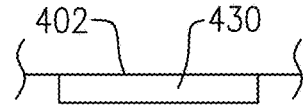
FIG. 5 shows yet another embodiment casing.

FIG. 5 shows a casing embodiment 402 where a stiffening element 430 is placed on an inner peripheral wall of the casing 408.

The stiffening elements 220/230, 320/330 and 430 are all fixed to the casing at least at their ends.

While H and bar shaped stiffening elements are shown they may be any number of other shapes, e.g. T or D shaped, etc.

Figure 6:
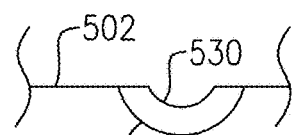
FIG. 6 shows yet another embodiment casing.

FIG. 6 shows yet another embodiment where a casing 502 has an area of concern 512. A dimple 530 is provided in a wall of the casing to provide the local stiffening element.

Figure 7:
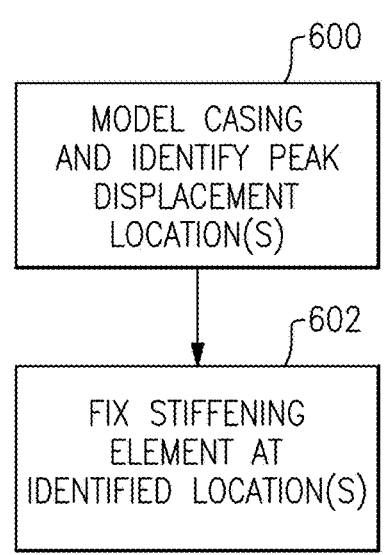
FIG. 7 is a flow chart of a method.

FIG. 7 is a flow chart of a method according to this disclosure. At step 600 a casing is modeled to identify peak displacement locations. At step 602 a stiffening element is fixed to a wall of the casing.

A gas turbine engine under this disclosure could be said to include a compressor section 24, a combustor 26 and a turbine section 28. At least one casing 202/302/402/502 surrounds at least one of the compressor and turbine section. The at least one casing is formed of sheet metal, and has at least one potential peak displacement point due to vibration across a speed range of the at least one of the compressor and turbine section. A stiffening element 220/230/320/330/430/530 is fixed to a wall of the casing at the at least one potential peak displacement point.

In another embodiment according to the previous embodiment, there are a plurality of peak displacement points at distinct locations and a plurality of the stiffening elements.

In another embodiment according to any of the previous embodiments, the wall is an outer wall of the casing.

In another embodiment according to any of the previous embodiments, the wall is an inner wall of the casing.

In another embodiment according to any of the previous embodiments, there is at least one accessory 209 mounted to a wall of the casing and impacting on the at least one peak displacement points.

In another embodiment according to any of the previous embodiments, there is a cutout 204/304 through the wall of the casing and the at least one peak displacement point is adjacent one wall of the cutout.

In another embodiment according to any of the previous embodiments, the at least one stiffening element is H-shaped 220/230.

In another embodiment according to any of the previous embodiments, the at least one stiffening element 320/330/430 is bar shaped.

In another embodiment according to any of the previous embodiments, the at least one stiffening element is a dimple 530 formed in the wall.

In another embodiment according to any of the previous embodiments, the stiffening element is formed of sheet metal.

A method of providing a casing for a gas turbine engine under this disclosure could be said to include 1) modeling a casing design 600 for a casing to be formed of sheet metal, 2) determining peak displacement locations based upon the modeling of step 1) and 3) providing a stiffening element 602 at at least one of the peak displacement location, the stiffening element fixed to a wall of the casing.

In another embodiment according to any of the previous embodiments, there are a plurality of peak displacement points at distinct locations and a plurality of the stiffening elements.

In another embodiment according to any of the previous embodiments, the wall is an outer wall of the casing.

In another embodiment according to any of the previous embodiments, the wall is an inner wall of the casing.

In another embodiment according to any of the previous embodiments, there is at least one accessory mounted to a wall of the casing and impacting on the at least one peak displacement locations.

In another embodiment according to any of the previous embodiments, there is a cutout through the wall of the casing and the at least one peak displacement point is adjacent one wall of the cutout.

In another embodiment according to any of the previous embodiments, the at least one stiffening element is H-shaped.

In another embodiment according to any of the previous embodiments, the at least one stiffening element is bar shaped.

In another embodiment according to any of the previous embodiments, the at least one stiffening element is a dimple formed in the wall.

In another embodiment according to any of the previous embodiments, the stiffening element is formed of sheet metal.

Although embodiments have been disclosed, a worker of skill in this art would recognize that modifications would come within the scope of this disclosure. For that reason, the following claims should be studied to determine the true scope and content.

What is claimed is:

1. A method of providing a casing for a gas turbine engine comprising the steps of:
   1) modeling a casing design for a casing to be formed of sheet metal;
   2) determining at least one peak displacement point based upon the modeling of step 1); and
   3) providing a stiffening element at the at least one peak displacement point, the stiffening element fixed to a wall of the casing; wherein there is a cutout through the wall of the casing and the at least one peak displacement point is adjacent one wall of the cutout, and the at least one stiffening element is dimple formed in the wall.

2. The method as set forth in claim 1, wherein there are a plurality of peak displacement points at distinct locations and a plurality of the stiffening elements.

3. The method as set forth in claim 2, wherein the wall is an outer wall of the casing.

4. The method as set forth in claim 2, wherein the wall is an inner wall of the casing.

5. The method as set forth in claim 2, wherein there is at least one accessory mounted to a wall of the casing and impacting on the at least one peak displacement locations.

6. The method as set forth in claim 2, wherein the stiffening element is formed of sheet metal.

7. The method as set forth in claim 1, wherein the wall is an outer wall of the casing.

8. The method as set forth in claim 7, wherein there is at least one accessory mounted to a wall of the casing and impacting on the at least one peak displacement locations.

9. The method as set forth in claim 1, wherein the wall is an inner wall of the casing.

10. The method as set forth in claim 9, wherein there is at least one accessory mounted to a wall of the casing and impacting on the at least one peak displacement locations.

11. The method as set forth in claim 1, wherein there is at least one accessory mounted to a wall of the casing and impacting on the at least one peak displacement locations.

12. The method as set forth in claim 1, wherein the stiffening element is formed of sheet metal.

* * * * *